United States Patent
van Schalkwijk et al.

(10) Patent No.: US 7,227,336 B1
(45) Date of Patent: Jun. 5, 2007

(54) LITHIUM ION RAPID CHARGING SYSTEM AND METHOD

(76) Inventors: Walter A. van Schalkwijk, 4107 SE. 86th Ave., Mercer Island, WA (US) 98040; Richard S. Penn, 1624 215th Pl. SE., Sammamish, WA (US) 98075

( * ) Notice: Subject to any disclaimer, the term of this patent is extended or adjusted under 35 U.S.C. 154(b) by 353 days.

(21) Appl. No.: 10/405,830

(22) Filed: Apr. 1, 2003

Related U.S. Application Data

(60) Provisional application No. 60/369,666, filed on Apr. 2, 2002.

(51) Int. Cl.
*H02J 7/04* (2006.01)

(52) U.S. Cl. .................. 320/141; 320/139; 324/431

(58) Field of Classification Search ............... 320/139, 320/136, 134, 133, 144, 141, 145, 128; 324/426, 324/430, 431, 141, 145, 128
See application file for complete search history.

(56) References Cited

U.S. PATENT DOCUMENTS

| | | | | |
|---|---|---|---|---|
| 5,767,659 A | * | 6/1998 | Farley | 320/106 |
| 6,160,382 A | * | 12/2000 | Yoon et al. | 320/136 |
| 6,232,750 B1 | * | 5/2001 | Podrazhansky et al. | 320/139 |
| 6,456,042 B1 | * | 9/2002 | Kwok | 320/134 |
| 6,480,003 B1 | * | 11/2002 | Ugaji et al. | 324/430 |

\* cited by examiner

*Primary Examiner*—Karl Easthom
*Assistant Examiner*—Robert Grant
(74) *Attorney, Agent, or Firm*—James L Davison

(57) ABSTRACT

The present invention discloses a method and system for the rapid charging of a lithium-ion battery. A charging algorithm is applied to modify a charging pulses frequency, duty cycle and amplitude depending on the measurement of the battery temperature. The charging algorithm is based on the chemical Diffusion Coefficient of the battery, with this Diffusion Coefficient, in turn, dependent on the type of solvent system, the type of electrolyte, and the temperature of the battery.

2 Claims, 8 Drawing Sheets

LITHIUM ION RAPID CHARGING SYSTEM AND METHOD

RELATED APPLICATIONS

This application claims the priority of Provisional Application 60/369,666 filed Apr. 2, 2002.

BACKGROUND

Pulse charging of an electrochemical cell (a.k.a. a battery) has been shown by many to increase the rate of charge acceptance, thus decreasing the time necessary to charge the cell (or battery).

Most pulse charge algorithms use an ad hoc choice of pulses with no consideration for processes occurring in the battery. Even those algorithms where consideration has been given to the electrochemical processes, erroneous assumptions have been made which result in pulses that are not efficient: they are not properly tuned to the timescale of the electrochemistry. For lithium-ion batteries there are several diffusion processes, each with its own time domain. When the battery is charged, each of these processes is occurring simultaneously (described from cathode-to-anode in the cell):

Lithium ions diffuse out of the cathode and enter the electrolyte where they are solvated by one or more solvent molecules. They may also form ion-pairs or ion-aggregates in solution, with each type of species having its own temperature-dependent concentration and mobility (diffusivity) in the electrolyte.

Driven by the electric current, the lithium-containing species in the electrolyte solution diffuse toward the anode where they form an electrochemical double-layer at the boundary between the electrolyte and the *Solid Electrolyte Interphase* (SEI). Hereafter this layer will be referred to as the "boundary layer." The SEI is a passivation layer of reacted material at the surface of the anode. [A passivation layer is a protective layer that prevents further reactions that would erode or corrode the an electrode. Passivation layers are often electronically and/or ionically conductive. In this case, the passivation layer protects the anode from "active" reaction with electrolyte.] The SEI is formed during the first few formation cycles of the cell. Most experimental evidence indicates that the SEI is formed by reaction of the electrolyte with the carbon. The SEI is conductive to lithium ions, but lithium-ions are not stored there (as they are in the anode), and as such it is referred to as a solid electrolyte.

Lithium ions shed their paired species (anions and solvent molecules) and enter the SEI where they continue to diffuse toward the carbon. Lithium ions move from the SEI into the carbon where they continue to diffuse and occupy available sites in the carbon. Each of these processes has an associated time constant. Diffusion of the lithium through the solids (carbon, lithiated metal oxide cathode, and SEI) is relatively fast. The processes occurring at and in the boundary layer are the slowest and are referred to as "rate-limiting."

It is manipulation of this rate-limiting step that will lead to increased rates of charge for a lithium-ion cell (and battery). The processes occurring in a lithium-ion-polymer (a.k.a. lithium-polymer), and a lithium-ion-gel (a.k.a. lithium-ion-polymer-gel) cell are essentially similar and can be assessed and manipulated by the same methods.

The treatment of the processes in the boundary layer (the boundary layer is that volume of the electrolyte, adjacent to the electrode, where the concentration of lithium ions is in flux and can be manipulated) is not mathematically rigorous or phenomenologically detailed, but can be generally determined given the chemistry and chemical reactions that occur.

The two boundary conditions for this treatment are a consideration of the boundary layer with 1) no flux of lithium ions (zero-current condition) and 2) a constant flux (constant-current condition). The intermediate conditions between these two boundary conditions are of particular interest because during the intermediate condition the boundary layer is susceptible to being manipulated. The way these intermediate conditions can be affected is by using instantaneous current pulses or by using sinusoidal waveforms with short rise times.

Fick's Second Law of diffusion governs most time-dependent diffusion problems in electrochemistry. Fick's law is in the form of a differential equation, which implies that it describes what is common to all diffusion problems and not just the characteristics of a particular diffusion problem. Fundamentally, the concentration of a species (in this case, ions in solution and near the boundary layer) is a function of position and time $$c = f(x,t)$$

Fick's laws of diffusion are well known to those skilled in the science of batteries and other electrochemical devices.

SUMMARY

The present invention discloses a method and system for the rapid charging of a lithium-ion battery. A charging algorithm is applied to modify a charging pulses frequency, duty cycle and amplitude depending on the measurement of the battery temperature. The charging algorithm is based on the chemical Diffusion Coefficient of the battery, with this Diffusion Coefficient, in turn, dependent on the type of solvent system, the type of electrolyte, and the temperature of the battery. Upon reaching a particular criteria the charging pulse can be terminated in one of three ways. The pulse can be terminated when the sum of the battery voltage, as defined by the intrinsic free energy difference between the negative and positive electrode materials, and a concentration polarization, reach a predefined value. Or the charging pulse can be reduced when the sum of the battery voltage, as defined by the intrinsic free energy difference between the negative and positive electrode materials, and a concentration polarization, reach a predefined value. And lastly the charging pulse can be eliminated and the system can maintain a constant charging voltage when the sum of the battery voltage, as defined by the intrinsic free energy difference between the negative and positive electrode materials, and a concentration polarization, reach a predetermined level.

DETAILED DESCRIPTION

Figure 1:
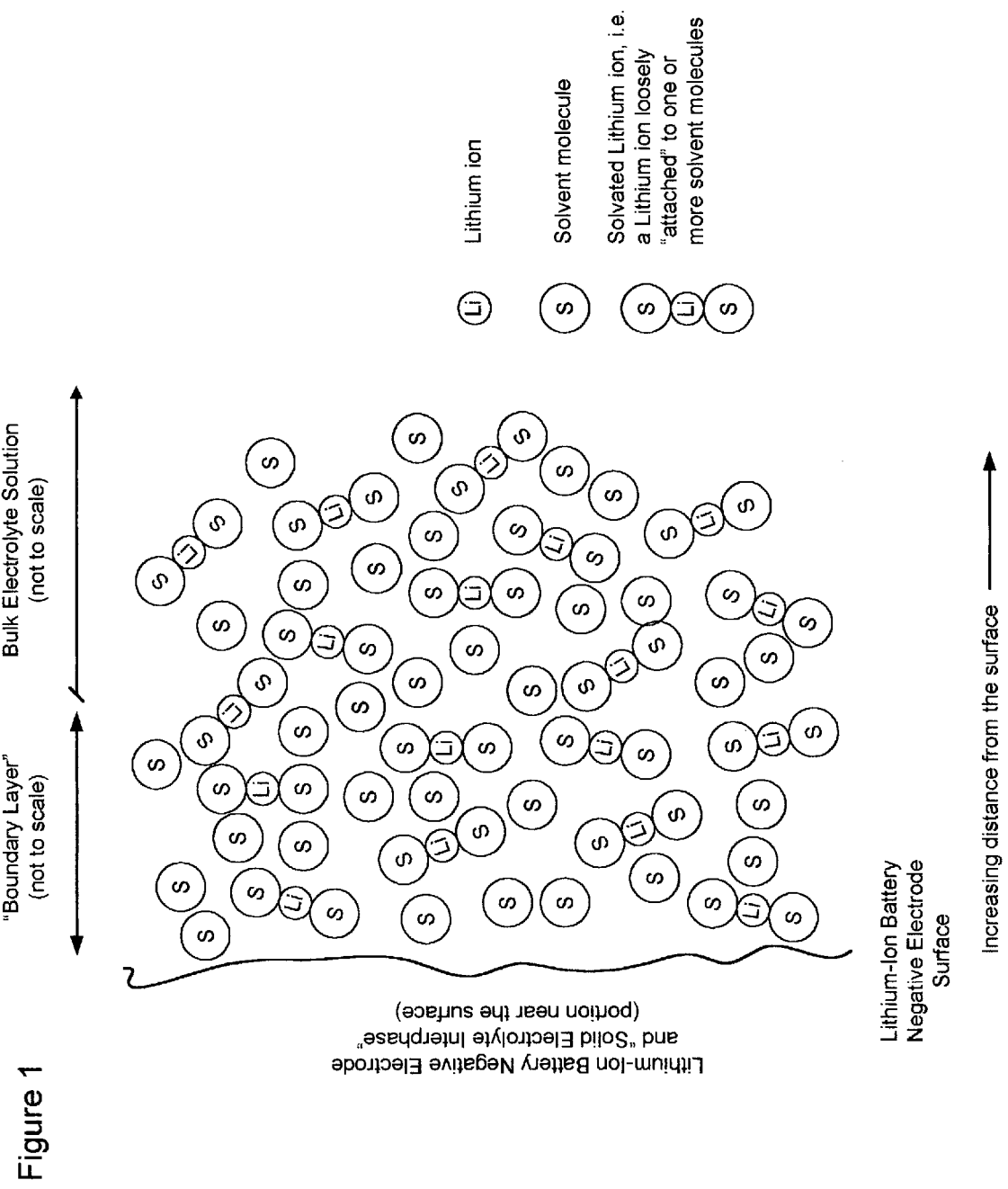
FIG. 1 shows a simplified version of the system state prior to charging.

The objective of pulsing the current into a battery or other electrochemical device is to maximize the amount of active species, in this case lithium ions, in the boundary layer so they can participate in the battery reaction. In this way, with the concentration of active species (lithium ions) maximized in the boundary layer, the reaction of interest, i.e. charging the battery by inserting these ions into the anode can proceed at its fastest possible rate.

Pulse Shape

Effective pulsing of electrochemical systems approximates a square-wave pulse with "instantaneous" application of a current to induce a flux of ions in the desired direction. In practice, the instantaneous application of a current takes a finite amount of time dictated by the slewing rate of the circuit applying the current. However the application of a pulse with an extremely short rise time (fast slewing rate) can cause electromagnetic interference or noise that may be unacceptable in many applications. Pulses should be generated with finite rise times to meet circuit noise requirements. These rise times can be up to and including effectively instantaneous times (for applications where electromagnetically generated noise is not a consideration). The duration of the pulse dictates the pulse width (sum of on- and off-times) and the duty cycle (percentage of on-time). The maximum amplitude of the pulse is dictated by the battery size and limitations of the battery's internal impedance. The termination of a pulse is effectively instantaneous and is solely dictated by the slewing rate of the electronics. There are no implications for electromagnetic noise during the termination of the pulse. The current applied during the pulse is always a "positive" current; that is the current is always applied in a manner to drive the flux of lithium ions toward the electrode and maximize concentration of lithium ions in the boundary layer.

Pulse Duty Cycle

The duration of the on cycle of a pulse with respect to the total pulse width is referred to as the duty cycle. The duty cycle is derived from solution of Fick's Second Law of Diffusion for the various pulse shapes in order to maximize the amount of lithium ions in the boundary layer. The solution of Fick's Second Law of Diffusion shows that the duty cycle will depend on (1) the pulse shape (a function of the circuitry) and (2) the diffusion coefficient of lithium ions in the electrolyte which is in turn a function of temperature. During the off-time of the pulse the electrolyte in the boundary layer effectively relaxes and allows solvent molecules (in the case of liquid electrolytes), which had previously been "attached" to lithium ions (the process of salvation) to move away from the boundary layer and make room for new lithium ions to enter the boundary layer. This process is temperature and time dependent.

Measurement of the Diffusion Coefficient

A numerical solution to Fick's Second Law of Diffusion is required to determine the optimal pulse width and duty cycle. This requires a measurement of the Diffusion Coefficient of lithium ions in the battery electrolyte (liquid organic electrolyte containing lithium ions from a dissolved lithium salt, lithium ions impregnated in a solid ionically conducting polymer, or lithium ions impregnated in a solid ionically conducting polymer with organic solvent added as a wetting agent). The Diffusion Coefficient must be measured for the range of temperatures over which the charge algorithm will be applied (operational temperature range for the battery charger). The techniques for measurement of Diffusion Coefficients in electrochemical systems is well known to those skilled in the science of batteries.

Application of the Charge Algorithm

The charge is allowed to proceed in either of two ways:

1) Charge may be applied as a constant current (constant flux) as is customary for lithium ion batteries. The constant current is applied until the battery reached a pre-determined battery voltage as measured by the charger circuitry, which includes integrated circuits commonly used to supervise battery operation. At one pre-determined battery voltage, the constant current is discontinued and the pulse charge algorithm is applied. When the constant current is removed, the battery voltage as measured by the charge circuitry will decrease slightly due to decreased polarization in the battery. The pulse algorithm is then applied until the battery attains a second pre-determined battery voltage whereupon the battery charging is terminated. Or 2) The pulse charge algorithm can be applied from the start of charge. The amplitude of the charge current pulse can be as large as 2 times the "C-Rate." [The C-Rate is a current rate equivalent to the capacity, C, of the battery as measured in ampere-hours as customarily defined by those skilled in the art. A 3 ampere-hour battery would have a charge rate of 3 amperes when charged at the C-Rate.] The pulse charge is continued until the battery reached a first pre-determined voltage (switching voltage). At this first pre-determined voltage, the pulse charge magnitude is reduced and pulse charging is continued until the battery reached a second pre-determined termination voltage that is higher than the switching voltage.

The battery charge algorithm incorporates measurement of temperature of the battery so the current (amplitude), pulse width, and pulse duty-cycle can be modified to facilitate efficient and safe charging of the battery at the optimal rate. This measurement of temperature modifies the charge using knowledge of the lithium ion Diffusion Coefficient embedded in the charge circuitry in a digital or analog configuration.

Figure 6:
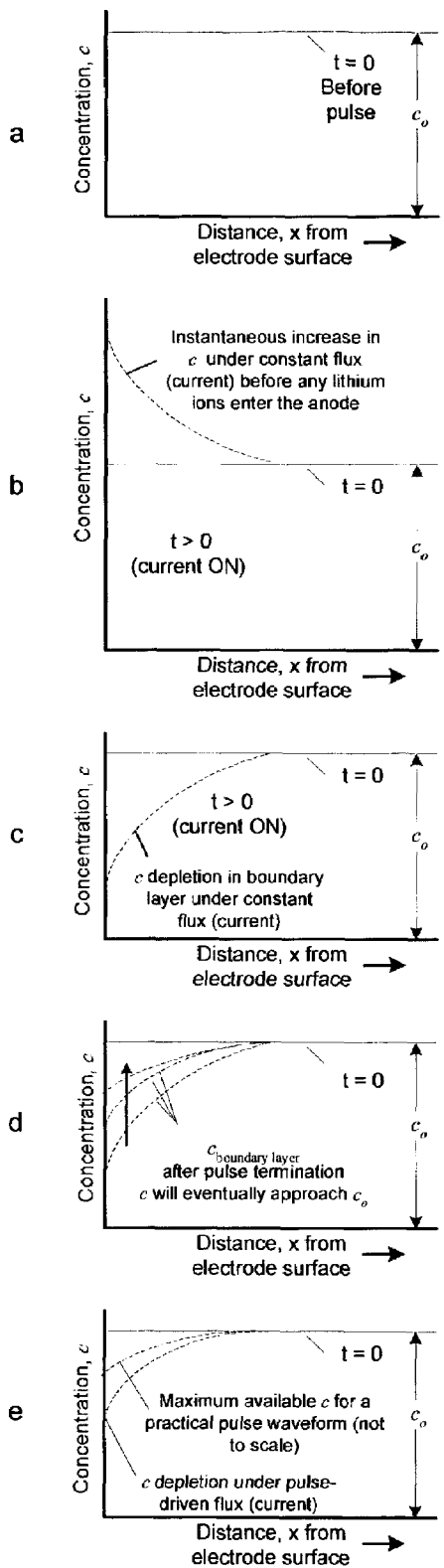
FIG. 6 shows various concentrations of lithium ions before, during and after the charging pulse has been applied.

FIG. 1 shows a simplified version of the state of the system before a charging current is applied. On the left is the battery negative electrode and it's SEI at the surface. The composition of the electrolyte in the boundary layer is similar to that of the bulk electrolyte solution and can be represented by co (see FIG. 6a). There is a roughly even distribution of solvent molecules and solvated lithium ions (a lithium ion loosely attached to one or more solvent molecules) throughout the electrolyte. Anions of the lithium salt dissolved in the electrolyte are also present, but they are omitted from the figures for simplicity. There are also some "free" lithium ions. In the text, the term "solvated lithium ions" and "lithium ions" are used interchangeably. The definitions are well understood by those skilled in the art.

Figure 2:
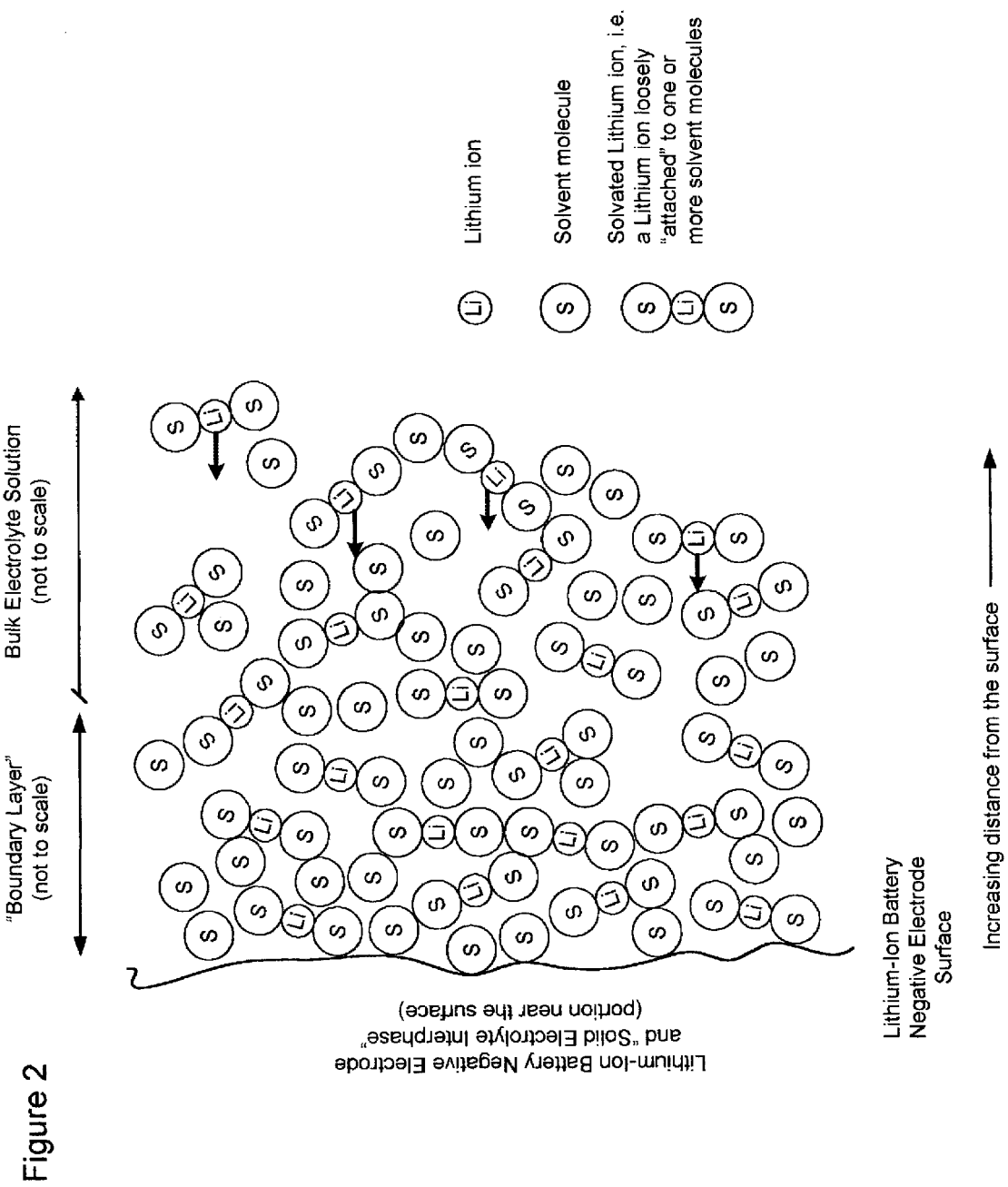
FIG. 2 shows the instantaneous changes as the current is applied.
Figure 3:
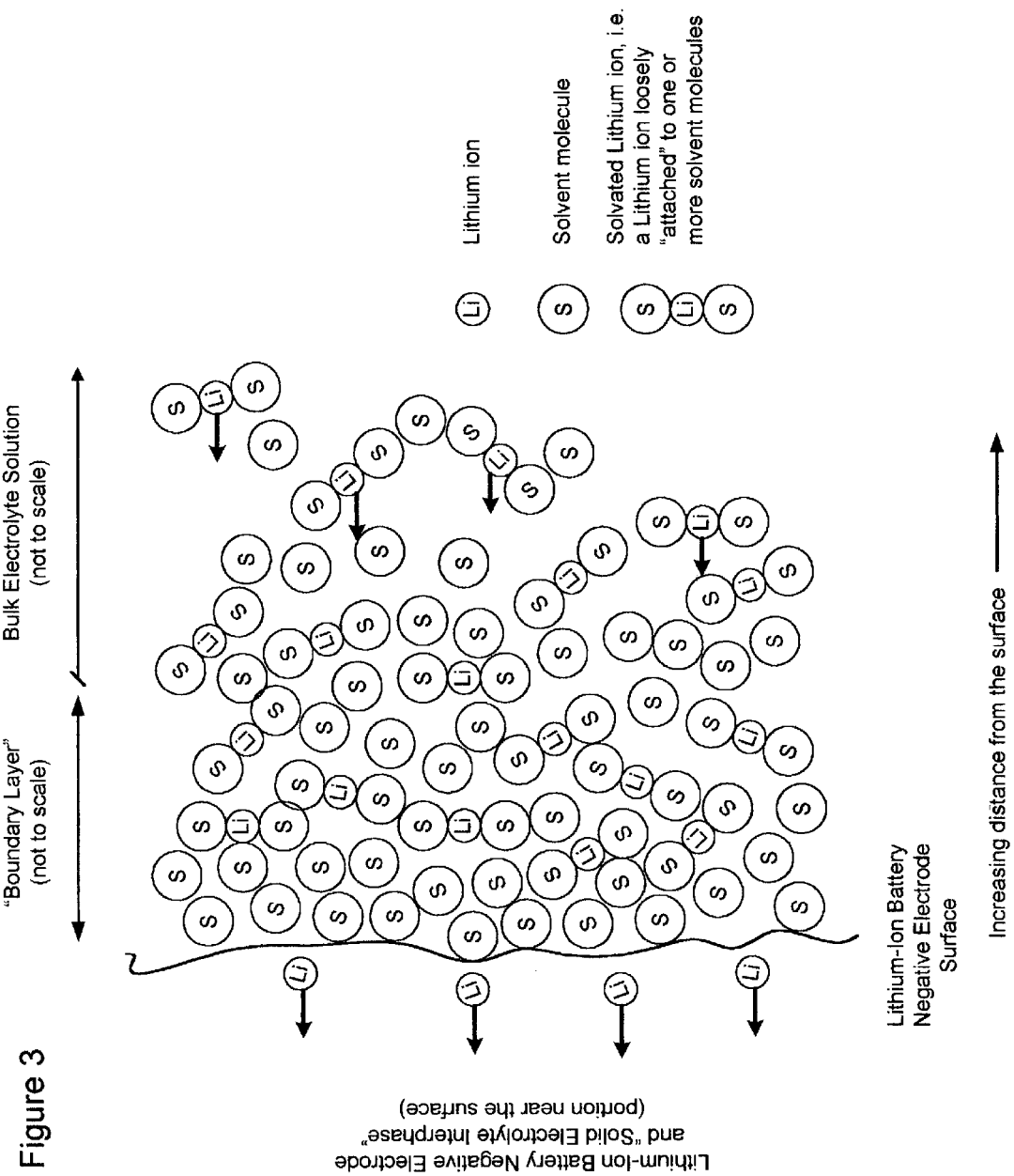
FIG. 3 shows the lithium ions separating from their solvent carriers and moving into the SEI layer.

FIG. 2 shows the instantaneous changes as the current is applied. A flux of solvated lithium ions, driven by the current, moves toward the SEI. The concentration of solvated lithium ions in the boundary layer very briefly appears to increase (see FIG. 6b). At almost the same instant, lithium ions lose their attendant solvent molecules and move into the SEI and proceed into the battery negative electrode (see FIG.

Figure 4:
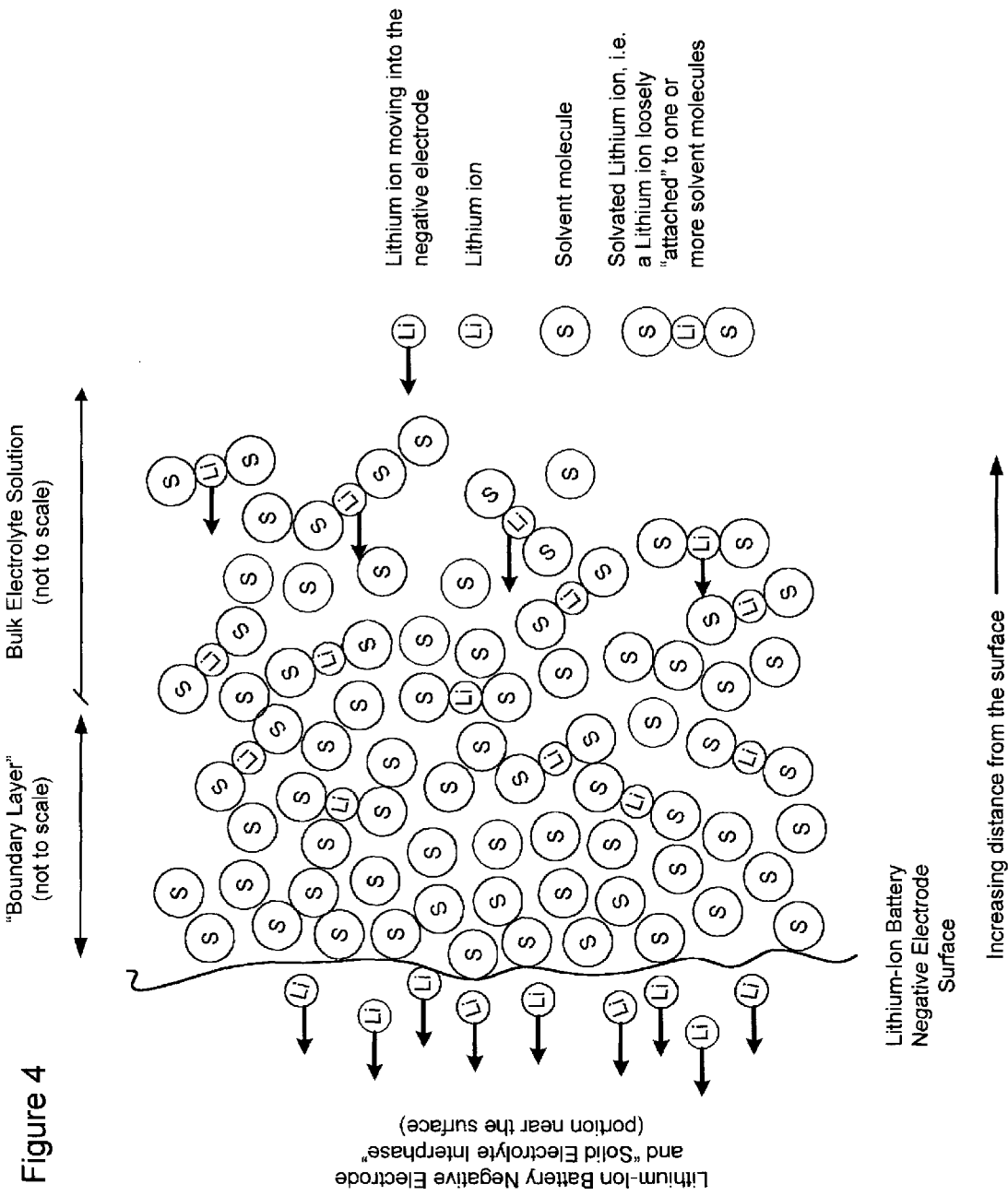
FIG. 4 shows the further transfer of lithium ions to the SEI layer and a buildup of solvent molecules close to the SEI layer.

3). This process is very fast. As this process proceeds under the constant flux, there is a depletion of solvated lithium ions in the boundary layer (see FIGS. 4 and 6c). If the constant flux remains, the concentration of solvated lithium ions in the boundary layer will resemble FIG. 6c indefinitely as lithium ions will lose their attendant solvent molecules and move into the SEI and battery negative electrode as fast as they get there.

Figure 5:
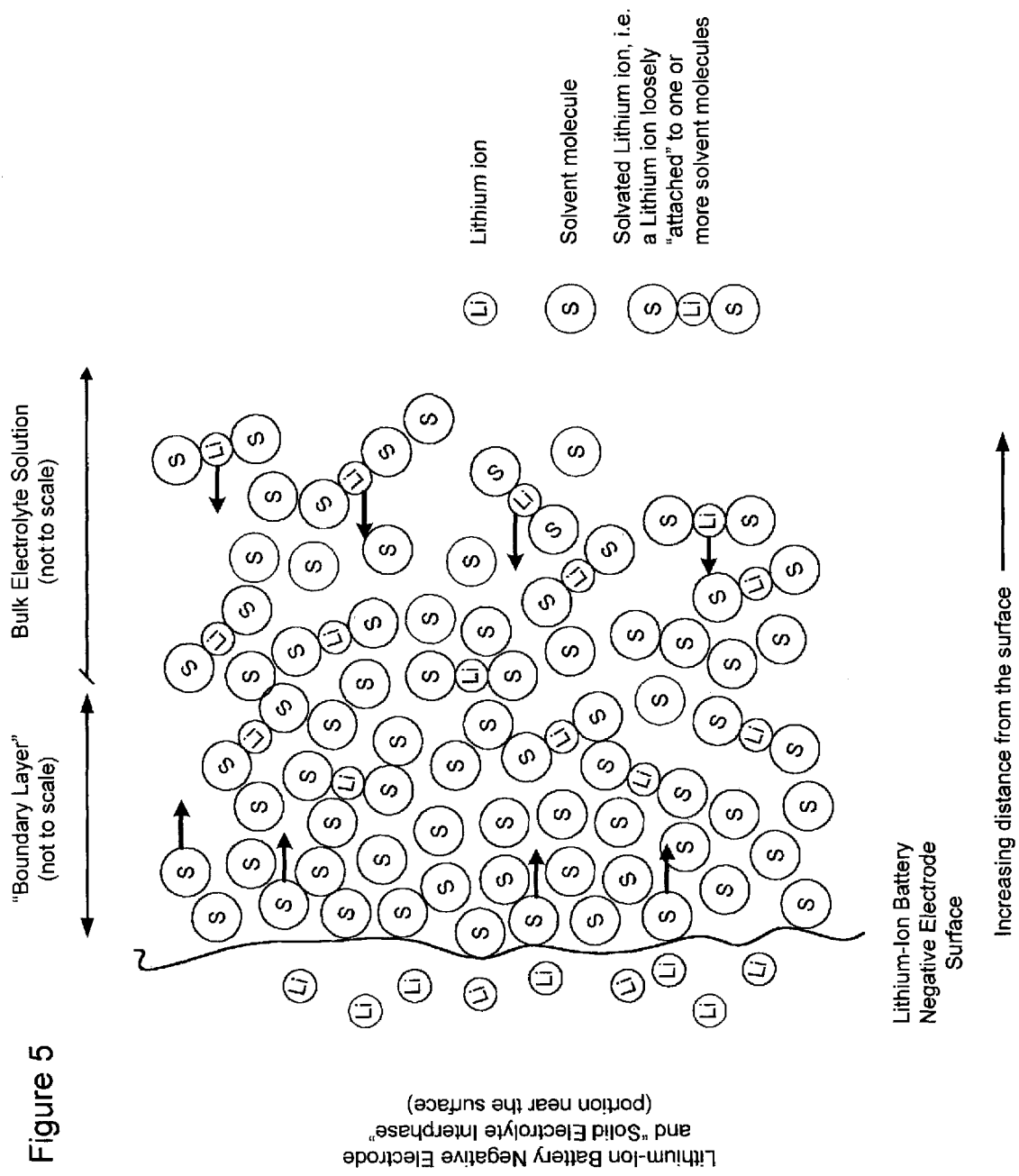
FIG. 5 shows the current turned off and a diffusion of solvent molecules back into the bulk electrolyte solution.

When the current is turned off, the electrically driven flux stops (see FIG. 5). Lithium ions in the SEI and electrode "stop" (in reality, the continue to move as they arrange themselves in the SEI and electrode as concentration gradients drive the small flux until a homogeneous distribution is attained). On the electrolyte side, the situation is essentially similar: there is an excess of solvent molecules because they no longer escort lithium ions. These solvent molecules will diffuse into the bulk of solution and solvated lithium ions will diffuse into the boundary layer (toward the SEI) (see FIG. 5). The concentration of solvated lithium ions in the boundary layer gradually increases (see FIG. 6d) until it again resembles the initial state (FIGS. 1 and 6a), but this takes a time on the order of seconds.

As just mentioned, the rearrangement by diffusion back to the original state is a comparatively slow process. The insertion of lithium ions into the SEI and electrode and their simultaneous depletion in the boundary layer are very fast processes and their actual rate depends on (1) the nature of the electrode and SEI, (2) the initial concentration of the lithium salt, (4) the identity of the lithium salt, the identity and composition of the solvent or solvent mixture used in the battery electrolyte, (5) the charging current used to drive the ions, and (6) the temperature.

The previous paragraphs describe the processes occurring at a lithium-ion battery negative electrode and its SEI during a constant current charge as is customarily applied. The depletion of solvated lithium ions in the boundary layer and the associated excess of solvent molecules in the same space, results in a concentration polarization (impedance), which drives the charge voltage for the battery above the equilibrium voltage of the battery at rest. If the charge current is too large, this polarization will become great enough that other undesirable electrochemical processes can take place in the battery. These can include decomposition of the solvent and the plating of metallic lithium (which is very undesirable in lithium-ion batteries).

In the application of the customary constant current—constant voltage (CCCV) charge algorithm, the battery electrodes change their composition with time (as expected) and the voltage of the system approaches that of full charge. During the constant current (CC) portion as described above, the concentration polarization caused by the depletion of solvated lithium ions in the boundary layer is almost constant.

When the sum of the battery voltage (as defined by the intrinsic free energy difference between the negative and positive electrode materials) and the concentration polarization reach a pre-defined value (e.g., 4.20 V for most Lithium-ion systems) the charge algorithm switches to a constant voltage (CV) mode. In this part of the charge algorithm a current is applied as before, but it continuously decreases in value so that the sum of the intrinsic battery voltage and concentration polarization remains at the constant value (e.g., 4.20 V). Eventually, the intrinsic battery voltage is at or near 4.20 V and the current is so small there is essentially no concentration polarization. At this point the CCCV charge algorithm is terminated.

The purpose of the present invention is to keep the maximum time-averaged amount of solvated lithium ions in the boundary layer to participate in the battery reaction (i.e., lose their attendant solvent molecules and enter the SEI and negative electrode). This is accomplished by applying the current in the form of a pulse. This pulse may be "instantaneous" (i.e., have a rapid slew rate so as to essentially be a square wave) or it may have a finite slew rate or be sinusoidal. During the on-portion of the pulse duty cycle ions are depleted as in the standard CCCV charge algorithm. However, the pulse is short enough to prevent complete depletion of solvated lithium ions from the double layer (see FIG. 6e). During the off-portion of the duty cycle, the concentration of solvated lithium-ions in the boundary layer recovers slightly (similar to the process seen in FIGS. 5 and 6d). The frequency of the charge pulse applied is proportional to the chemical diffusion coefficient of lithium ions in the particular solvent system and electrolyte (comprising a lithium salt with anion and one or more organic solvents) and the temperature. The frequency of the charge pulse and its duty cycle (percent of time "on" and "off") is changed with temperature as reflected in the dependence of the diffusion coefficient on temperature. In the application of the charge algorithm, the temperature dependence of the diffusion coefficient may be programmed into firmware or otherwise applied as is known to those skilled in the art.

Since the time-average amount of lithium ions (solvated or free) in the boundary layer is increased, the concentration polarization as described earlier is smaller and the battery can thus receive a higher current (pulse amplitude). The time-average current applied to the battery is higher than that during the constant current portion of the customary CCCV algorithm, thus the battery charges faster. The diffusion of lithium ions (solvated or free) is slower at low temperatures and higher at elevated temperatures. The result on the charge algorithm is that the frequency, duty cycle and amplitude of the pulse algorithm will be altered to maintain safe operation (observed charge voltage always lower than the regulated voltage). The essential elements of this description are the same for a sinusoidal waveform.

Charge Termination

The pulse charge algorithm can be terminated in three ways: (1) when the sum of the battery voltage (as defined by the intrinsic free energy difference between the negative and positive electrode materials) and the concentration polarization reach a pre-defined value (e.g., 4.20 V for most Lithium-ion systems) the charge can be terminated (CP mode). This will charge the battery to 90 to 95% of full charge as is customarily defined by those skilled in the art; (2) When the sum of the battery voltage and the concentration polarization reach a pre-defined value the amplitude of the pulse is reduced (lower current pulses) to maintain this pre-defined voltage value (this is referred to as current pulse—reduced pulse or CPRP mode); (3) When the sum of the battery voltage and the concentration polarization reach a pre-defined value, pulsing terminates and the battery charge is completed using a constant voltage controlled application of the current as with the customary CCCV algorithm. Charge termination methods 2 and 3 result in the battery being charged to 100% of full charge as is customarily defined by those skilled in the art. The use of a finite slew rate (for initiation of the pulse) or a sinusoidal waveform will prevent or minimize the amount of electronic noise generated by the charger circuit.

Figure 7:
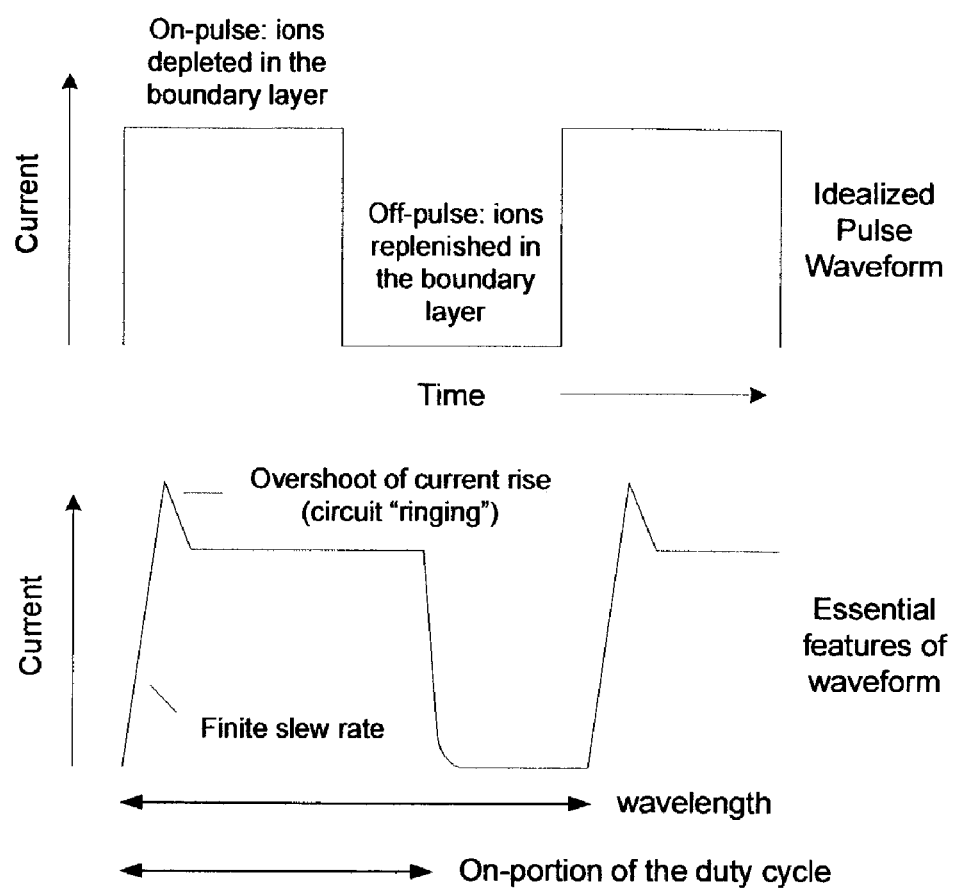
FIG. 7 shows two shapes that are possible for the charging waveform.
Figure 8:
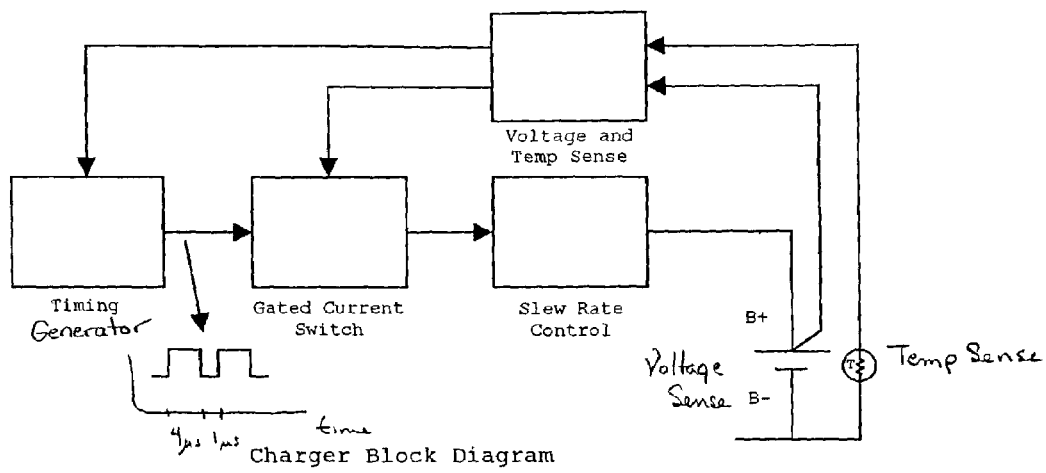
FIG. 8 is a block diagram of the charging and sensing circuit.

This pulse algorithm is intended for application to common lithium-ion batteries of all types. A square wave pulse represents the simplest application of an on-off pulse for charging (see FIG. 7, top). The essential elements are the wavelength (alternatively represented by frequency), duty cycle (percent of the wavelength as "on" and "off", the amplitude (magnitude of current), and slew rate (rise time for the current). A more realistic waveform is represented by FIG. 7, bottom.

Effect of Temperature on Application of the Algorithm.

At temperatures above the normal ambient temperature, the rate of diffusion of lithium ions is, as represented by the diffusion coefficient, greater. The lithium ions are more mobile and the battery is able to accept charge faster. This can be accomplished by any or all of the following changes to the waveform: (1) shorten the wavelength (i.e., increase the frequency), (2) increase the on-portion of the pulsed current, and (3) increase the amplitude (magnitude of current applied). At lower temperatures (below normal ambient), the rate of diffusion of lithium ions is, as represented by the diffusion coefficient, lower. The lithium ions are less mobile and the battery is only able to accept charge at a low rate. This can be accomplished by a decrease in the amplitude of the pulse (lower current) combined with one of the following changes to the waveform: (1) increase the wavelength (i.e., decrease the frequency) or (2) decrease the on-portion of the pulsed current.

Conclusion:

Pulse frequency and duty cycle (% on and % off) are functions of the Diffusion Coefficient (D) of lithium ions in solution. The Diffusion Coefficient of lithium ions in solution is a function of temperature. This is critical in the non-aqueous electrolyte solutions used in lithium batteries, especially at low temperatures. Its impact is that the pulse frequency and duty cycle and the pulse amplitude (current pulse magnitude), which is partly determined by the cell size, are therefore functions of temperature. The slew rate of the electronics has important impact on products for portable equipment.

While preferred embodiments of the invention have been shown and described, it will be apparent to those skilled in this art that various modifications may be made in these embodiments without departing from the spirit of the present invention. For that reason, the scope of the invention is set forth in the following claims.

We claim:

1. A method for rapid charging of a lithium ion battery at a particular temperature, said battery with a negative and a positive electrode and said battery including a solvent system and an electrolyte, comprising:
   a) measuring the diffusion coefficient of said battery at a series of battery temperatures prior to charging, applying a constant current charge to the lithium ion battery until a sum of a lithium ion battery voltage, said sum defined as an intrinsic free energy difference value as measured between said negative electrode and said positive electrode, and a concentration polarization value, reaches a first predetermined value; then upon reaching said predetermined value
   b) applying a pulsed current charge to the lithium ion battery with a calculated frequency and a calculated duty cycle, said pulsed charge having a value dependent on a chemical diffusion coefficient of said battery, the chemical diffusion coefficient continually adjusted depending on actual battery temperature measured, with said chemical diffusion coefficient previously measured at a series of battery temperatures applied to the battery prior to charging; then
   c) reducing the pulsed current charge value when a sum of a lithium ion battery voltage, said sum defined as an intrinsic free energy difference value as measured between said negative electrode and said positive electrode, and a concentration polarization value, reaches a third predetermined value.

2. The method of claim 1 further including discontinuing the pulsed current charge and applying a constant voltage charge to the lithium ion battery when the sum of the lithium ion battery voltage reaches a fourth predetermined value.

* * * * *